US008189558B2

(12) United States Patent
Kim et al.

(10) Patent No.: US 8,189,558 B2
(45) Date of Patent: May 29, 2012

(54) METHOD AND APPARATUS FOR CREATING COMMON PHYSICAL CHANNEL

(75) Inventors: Tae-Joong Kim, Seongnam-si (KR); Gi-Yoon Park, Daejeon (KR); Il-Gyu Kim, Seoul (KR); Chan-Bok Jeong, Daejeon (KR); Hyeong-Jun Park, Daejeon (KR)

(73) Assignees: Electronics and Telecommunications Research Institute (KR); Samsung Electronics Co., Ltd (KR)

( * ) Notice: Subject to any disclaimer, the term of this patent is extended or adjusted under 35 U.S.C. 154(b) by 481 days.

(21) Appl. No.: 12/513,083

(22) PCT Filed: Oct. 30, 2007

(86) PCT No.: PCT/KR2007/005409
§ 371 (c)(1),
(2), (4) Date: Apr. 30, 2009

(87) PCT Pub. No.: WO2008/054126
PCT Pub. Date: May 8, 2008

(65) Prior Publication Data
US 2010/0067500 A1    Mar. 18, 2010

(30) Foreign Application Priority Data

Nov. 1, 2006  (KR) .................. 10-2006-0107247
Oct. 1, 2007  (KR) .................. 10-2007-0098706

(51) Int. Cl.
*H04J 3/06* (2006.01)
(52) U.S. Cl. ........................................ 370/350
(58) Field of Classification Search .................. None
See application file for complete search history.

(56) References Cited

U.S. PATENT DOCUMENTS

| 7,221,695 | B1 * | 5/2007 | Hwang et al. ............. 370/320 |
| 2005/0169349 | A1 | 8/2005 | Hwang et al. |
| 2006/0114812 | A1 * | 6/2006 | Kim et al. ............. 370/206 |
| 2006/0120332 | A1 | 6/2006 | Ali-Hackl et al. |
| 2006/0166690 | A1 | 7/2006 | Nishio et al. |
| 2007/0076668 | A1 * | 4/2007 | Tirkkonen et al. ........... 370/335 |
| 2008/0089282 | A1 * | 4/2008 | Malladi et al. ............. 370/329 |

FOREIGN PATENT DOCUMENTS

KR     1020000067709     11/2000

* cited by examiner

*Primary Examiner* — Anh-Vu Ly
(74) *Attorney, Agent, or Firm* — The Farrell Law Firm, P.C.

(57) ABSTRACT

The present invention relates to a common channel generating method and device in a downlink. Receiving performance by the mobile station is improved by efficiently allocating the resource and generating the common channel in the downlink. Also, transmission diversity applied to the number of transmit antennas of the base station and the common channel can be easily detected, thereby acquiring the mobile station's initial process.

15 Claims, 3 Drawing Sheets

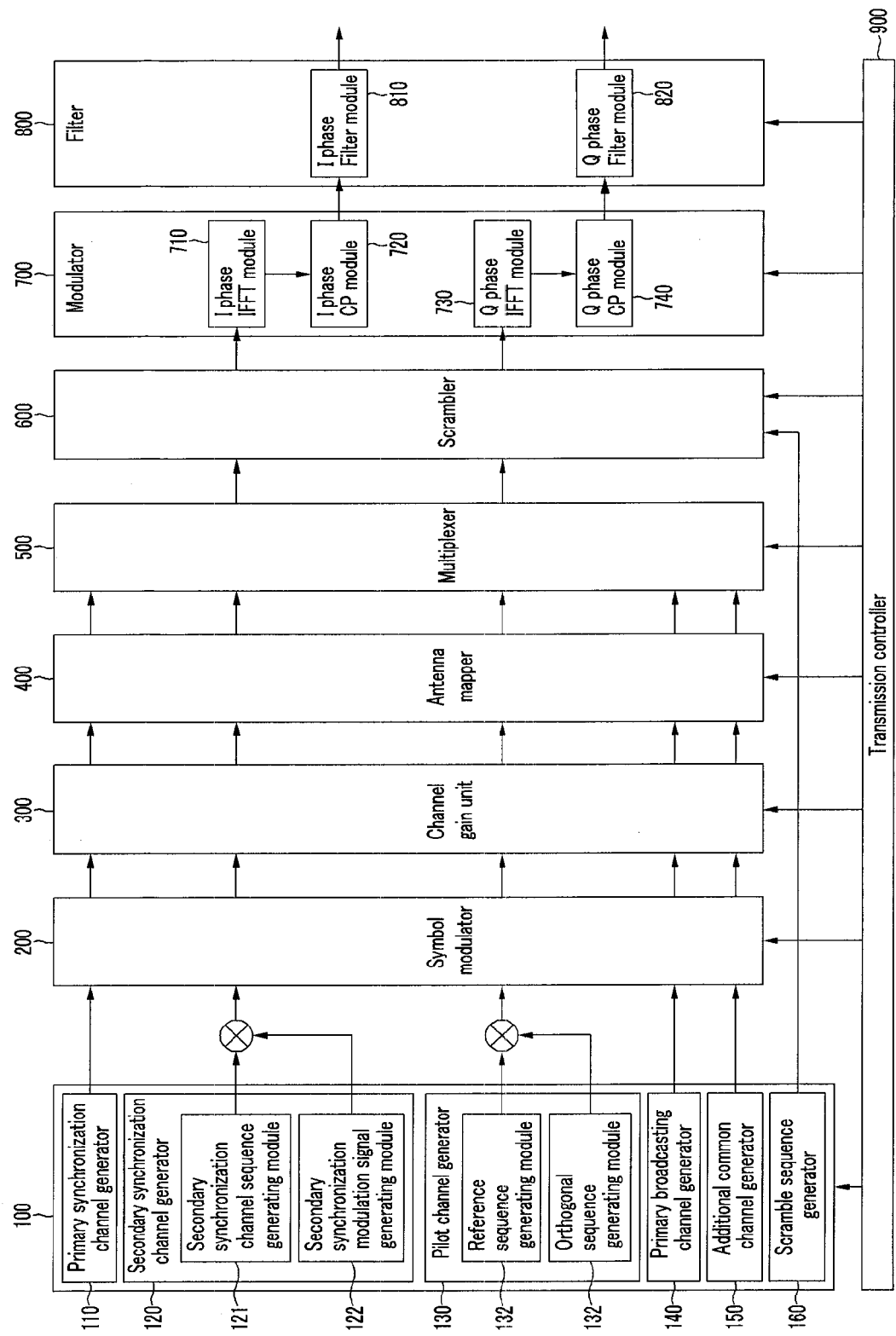
[FIG. 1]

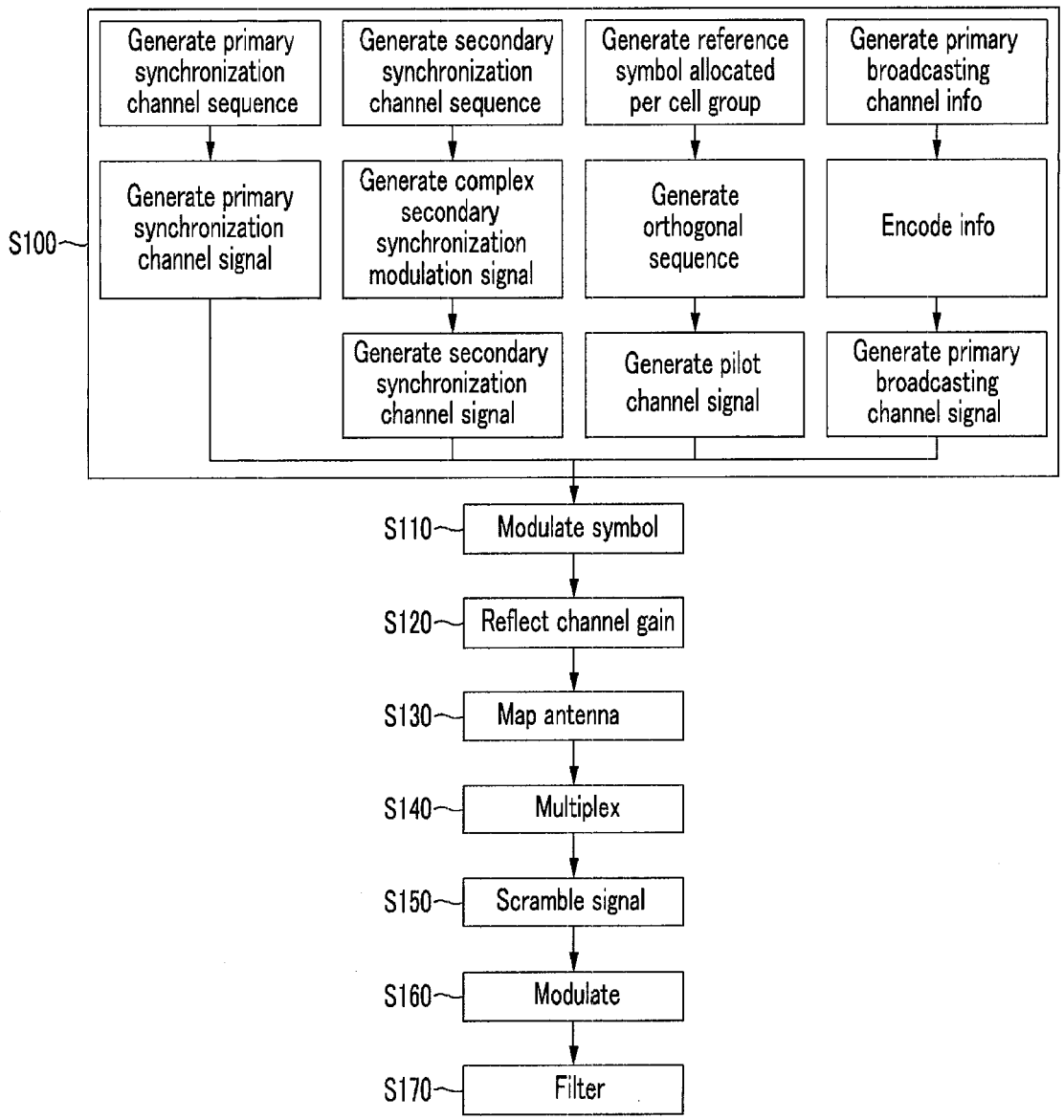
[FIG. 2]

[FIG. 3]
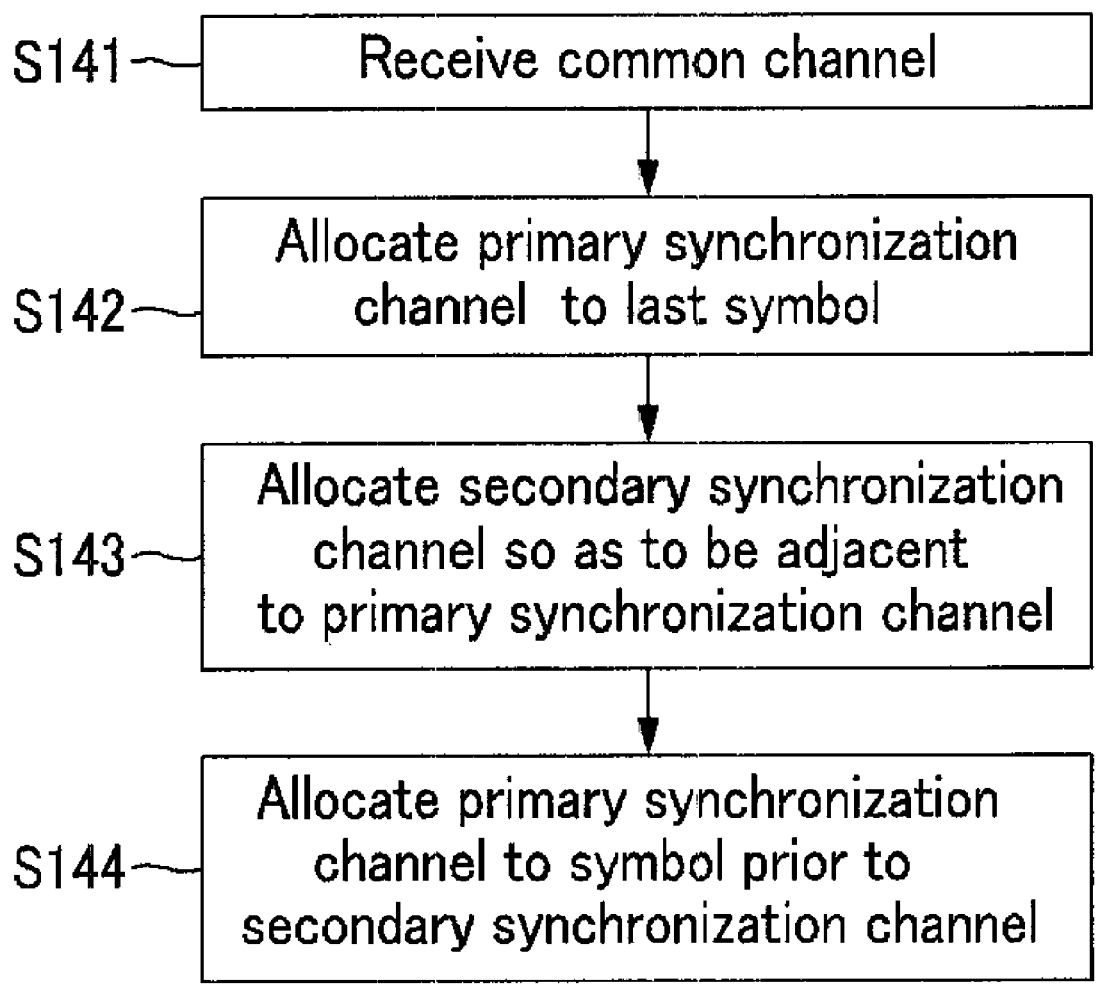

METHOD AND APPARATUS FOR CREATING COMMON PHYSICAL CHANNEL

TECHNICAL FIELD

The present invention relates to a method and device for generating a common channel in a downlink.

This work was supported by the IT R&D program of MIC/IITA [2005-S-404-12, 3G Evolution Wireless Transmission Method Development].

BACKGROUND ART

Since third generation mobile communication was developed, orthogonal frequency division multiplexing (OFDM) has been highlighted from among various multiple access methods. Particularly, the OFDM scheme has been positioned as the next generation mobile communication system in the wireless LAN for transmitting data at a high rate for low mobility, and the WiMAX and 3GPP long term evolution (LTE) that is one of the mobile communication skills having acquired mobility as well as the digital broadcasting.

Hereinafter, an OFDM downlink channel will be briefly described by exemplifying the OFDM used in the 3GPP LTE frequency division duplex (FDD) downlink. The downlink OFDM of the 3GPP LTE distinguishes a frequency resource by using subcarriers having a minimum frequency unit, and distinguishes a time resource by using sub-frames having a minimum time unit and including a plurality of OFDM symbols.

For example, a sub-frame for distinguishing the time resource includes 7 OFDM symbols in consideration of a small cell radius in the 3GPP LTE FDD system. In this instance, the 6 OFDM symbols are used as long symbols and the last OFDM symbol is used as a short symbol. However, in the case of considering a large cell radius, a sub-frame includes 6 OFDM symbols that are long symbols.

Common channels of the downlink include a primary synchronization channel (P-SCH) that is used for a mobile station to acquire sub-frame time synchronization, a secondary synchronization channel (S-SCH) that is used to find a cell group and acquire frame synchronization, a secondary broadcasting channel (SBCH) that is used to broadcast variable information of a cell, and a pilot channel (PCH) that is used for the mobile station to identify the cell and that is used to transmit a reference symbol. The channels are to be received from the base station in order for the mobile station to perform initial camping, and efficient resource allocation for the channels controls the mobile station to more easily perform the initial operation.

However, the frequency resource used for a primary broadcasting channel is determined by the 3GPP LTE from among the many channels. That is, the primary broadcasting channel is determined to use 72 subcarriers with reference to the central frequency, and the time resource for transmitting the primary broadcasting channel, the transmission diversity method, and the method for notifying the primary broadcasting channel's transmission diversity are not yet determined.

Particularly, the 3GPP LTE has not yet described the organic relationship between the downlink common channels, and an integrated mobile station process is difficult to describe. Also, regarding the 3GPP LTE standardization process, the usage of a common channel is determined and limited contents for respective channels are determined, but a method for generating the common channel has not yet been described in detail.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method and device for transmitting a common channel. More particularly, the present invention has been made in another effort to provide a method and device for generating a common channel in a downlink.

Technical Solution

In one aspect of the present invention, a device for generating a common channel for a downlink by a base station having a plurality of antennas includes: a common channel generator for generating a common channel signal for generating a common channel for transmitting common data to be provided to a plurality of mobile stations through the downlink, the common channel signal including a primary synchronization channel signal, a secondary synchronization channel signal, a pilot channel signal, and a primary broadcasting channel signal; an antenna mapper for mapping the generated common channel signal on the plurality of antennas; a multiplexer for receiving the common channel signal mapped on the antennas according to the antennas, allocating the common channel signal to the subcarrier and the time resource in the order of the primary broadcasting channel signal, the secondary synchronization channel signal, and the primary synchronization channel signal, and outputting a symbol; and a scrambler for scrambling the output symbol by using a scramble sequence.

In another aspect of the present invention, a method for generating a common channel for a downlink by a base station having a plurality of antennas includes: generating a common channel signal for generating a common channel for generating common data to be provided to a plurality of mobile stations through the downlink, the common channel signal including a primary synchronization channel signal, a secondary synchronization channel signal, and a primary broadcasting channel signal; mapping the generated common channel signals on the plurality of antennas; and receiving the common channel signals mapped on the plurality of antennas according to the plurality of antennas, allocating the common channel signals to the subcarrier and the time resource in the order of a predetermined primary broadcasting channel, a secondary synchronization channel, and a primary synchronization channel, and outputting a symbol.

Advantageous Effects

According to the present invention, receiving performance can be improved and a simple initial process of the mobile station can be acquired by efficiently allocating the resource of the physical channel caused by the common channel to the mobile station.

DESCRIPTION OF DRAWINGS

FIG. 1 shows a configuration diagram of a common channel transmitter according to an exemplary embodiment of the present invention.

FIG. 2 shows a flowchart for a common channel transmitting method according to an exemplary embodiment of the present invention.

FIG. 3 shows a flowchart for a common channel mapping method according to an exemplary embodiment of the present invention.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements. Also, the terms a unit, a device, and a module in the present specification represent a unit for processing a predetermined function or operation, which can be realized by hardware or a combination of hardware and software.

In the specification, the mobile station (MS) can be a terminal, a mobile terminal (MT), a subscriber station (SS), a portable subscriber station (PSS), user equipment (UE), and an access terminal (AT), and can include part or all the functions of the mobile terminal, the subscriber station, the portable subscriber station, and the user equipment.

The base station (BS) can be an access point (AP), a radio access station (RAS), a node B, a base transceiver station (BTS), and a mobile multihop relay (MMR)-BS, and can include part or all the functions of the access point, the access station, the node B, the base transceiver station, and the MMR-BS.

The downlink of the 3GPP LTE will be exemplified from among various communication systems in the exemplary embodiment of the present invention, and the exemplary embodiment of the present invention will not be limited thereto. Also, various common channels of the downlink will now be described. Here, the common channel represents a channel for a base station to broadcast (or transmit) common data to a plurality of mobile stations.

The common channel of the downlink is classified as a primary synchronization channel (P-SCH) that is used for a mobile station to acquire sub-frame time synchronization, a secondary synchronization channel (S-SCH) that is used to find a cell group and acquire frame synchronization, a secondary broadcasting channel (SBCH) that is used to broadcast variable information of a cell, and a pilot channel (PCH) that is used for the mobile station to identify the cell and that is used to transmit a reference symbol.

The primary synchronization channel and the secondary synchronization channel are used for the mobile station to acquire information on the cell group to which the mobile station belongs, and for frame time information. The channels transmit data from the base station to the mobile station twice in the 10 ms frame by using the time division multiplexing (TDM) scheme. The primary synchronization channel uses a subcarrier with 36 sequences that are alternately selected, and the secondary synchronization channel is allocated with reference to the central frequency by using 72 subcarriers. Since the allocated primary synchronization channel and the secondary synchronization channel transmit data by using different time resources, orthogonality for the time resource can be acquired.

In the case of transmitting data to the mobile station by using the TDM scheme, the base station can allocate the primary synchronization channel and the secondary synchronization channel to the OFDM symbol by using two methods. The first method is to allocate the primary synchronization channel and the secondary synchronization channel to different OFDM symbols from the same sub-frame. The first method can improve the detection performance of the secondary synchronization channel by applying the channel estimate through the primary synchronization channel to the receiving of the secondary synchronization channel.

The second method is to differentiate the sub-frames of data that are transmitted through the primary synchronization channel and the secondary synchronization channel, and fixing the time resource to the last OFDM symbol that corresponds to the short symbol. Cyclic prefixes (CP) can have the same value in the initial cell.

The pilot channel for transmitting the pilot signal and the reference symbol is used for the mobile station to estimate the channel or measure the channel quality indicator (CQI). Also, the pilot channel is used for the mobile station to identify the cell to which the mobile station belongs by using the cell group information acquired through the primary synchronization channel and the secondary synchronization channel and the frame time information of the cell. For this purpose, the pilot channel is generated based on a random sequence commonly allocated to the cell group and an orthogonal sequence allocated to the cell. That is, in order to identify the cell to which the mobile station belongs, the mobile station searches for the random sequence that corresponds to the cell group found in the secondary synchronization channel and the orthogonal sequence that is allocated to the cell and thereby identifies the corresponding cell.

The reference symbol that is transmitted through the pilot channel includes two reference symbols (a first reference symbol and a second reference symbol). The first reference symbol is inserted into the first OFDM symbol of the sub-frame and is then transmitted for each 0.5 ms and with intervals of 6 subcarriers. The second reference symbol configures a subcarrier offset together with the first reference symbol, and it is inserted into the OFDM and is then transmitted in the middle of the sub-frame for each 0.5 ms and with intervals of 6 subcarriers.

When the base station transmits data by using a plurality of transmit antennas, it is needed to acquire the orthogonality between the pilot channels that are transmitted by the antennas. Here, the orthogonality means that the data that are transmitted by a plurality of antennas are orthogonal, and the data transmitted by the antennas are identifiable since the product of the orthogonal data is 0. For this purpose, up to 2 antennas use the FDM scheme in the pilot channel transmitted by a single cell.

In detail, when there are two transmit antennas and the first antenna uses a reference symbol for data transmission, the second antenna transmits no signal to the corresponding reference resource, and hence the transmission data are identified. In a like manner, since the first antenna transmits no signal to the resource that corresponds to the reference symbol transmitted by the second antenna, the data are identified. Here, the data are depicted to be identified, and the data can be described to have acquired the orthogonality in a broader meaning.

A transmitter for transmitting the above-noted various common channels will now be described with reference to FIG. 1.

FIG. 1 shows a configuration diagram of a common channel transmitter according to an exemplary embodiment of the present invention.

As shown in FIG. 1, the common channel transmitter includes a common channel generator 100, a symbol modulator 200, a channel gain unit 300, an antenna mapper 400, a multiplexer 500, a scrambler 600, a modulator 700, a filter 800, and a transmission controller 900.

The common channel generator 100 for generating the common channel of the downlink includes a primary synchronization channel generator 110, a secondary synchronization channel generator 120, a pilot channel generator 130, a primary broadcasting channel generator 140, an additional common channel generator 150, and a scramble sequence generator 160.

The primary synchronization channel generator 110 generates a primary synchronization channel signal used for the mobile station to acquire sub-frame time synchronization.

The secondary synchronization channel generator 120 generates a secondary synchronization channel signal that is used for the mobile station to search for the cell group to which the mobile station belongs and acquire frame synchronization. The secondary synchronization channel generator 120 includes a secondary synchronization channel sequence generating module 121 for generating a secondary synchronization channel sequence, a secondary synchronization modulation signal generating module 122 for generating a secondary synchronization modulation signal for modulating the secondary synchronization channel, and a secondary synchronization symbol generating module 123 for generating a secondary synchronization channel signal by multiplying the secondary synchronization channel sequence generated by the secondary synchronization channel sequence generating module 121 and the secondary synchronization modulation signal generated by the secondary synchronization modulation signal generating module 122. Here, the secondary synchronization symbol generating module 123 is described to be a multiplier.

The pilot channel generator 130 generates a pilot signal and a reference symbol to be used for the mobile station to check the cell in which the mobile station is located. The pilot channel generator 130 includes a reference sequence generating module 131 for generating a reference sequence that is allocated to the cell group to which the mobile station belongs, an orthogonal sequence generating module 132 for generating an orthogonal sequence that is used to identify the cell in the cell group including a plurality of cells, and a reference symbol generating module 133 for generating a pilot channel signal that is used for the reference symbol by multiplying the reference sequence and the orthogonal sequence. Here, the reference symbol is similar to the pilot channel. The reference symbol generating module 133 is described to be a multiplier.

The primary broadcasting channel generator 140 generates a primary broadcasting channel signal that is used for the base station to broadcast fixed information to the cell. The additional common channel generator 150 generates various common channel signals that are not given in the above description. For example, the additional common channel includes a paging channel, a broadcast message channel, and a paging indication channel. The scramble sequence generator 160 generates a scramble sequence that is used for the scrambler 600 to perform a scrambling process.

The symbol modulator 200 modulates the symbol by using a plurality of common channels generated by the common channel generator 100. The channel gain unit 300 receives the symbol-modulated signal from the symbol modulator 200, and applies the gains of a plurality of common channels thereto.

The antenna mapper 400 performs transmission diversity on a plurality of antennas by using the signal to which the channel gain is applied when the base station has a plurality of antennas. The multiplexer 500 receives the signal to which the transmission diversity is performed by the antenna mapper 400 through the respective antennas, allocates the signal to a predetermined subcarrier and a resource (i.e., OFDM according to the exemplary embodiment of the present invention), and outputs a signal including an in-phase signal and a quadrature-phase signal.

The scrambler 600 scrambles the signal multiplexed by the multiplexer 500 by using a scramble sequence generated by the scramble sequence generator 160.

The modulator 700 receives the scrambled signal from the scrambler 600 and modulates the signal. The modulator 700 includes an in-phase inverse fast Fourier transform (FFT) module 710, an in-phase cyclic prefix (CP) module 720, a quadrature phase inverse FFT module 730, and a quadrature phase CP module 740. The in-phase inverse FFT module 710 and the quadrature phase inverse FFT module 730 apply inverse FFT on the in-phase signal and the quadrature phase signal scrambled by the scrambler 600 to convert the same into signals in the time domain, and output resultant signals. The in-phase CP module 720 and the quadrature phase CP module 740 insert a CP into each inverse FFT-performed signal, and output resultant signals. The OFDM modulation is performed in the exemplary embodiment of the present invention, to which the present invention is not restricted.

The filter 800 filters the OFDM-modulated signal by the modulator 700 and outputs a resultant signal. The filter 800 includes an in-phase filter module 810 and a quadrature phase filter module 820, receives the in-phase signal and the quadrature phase signal OFDM-modulated by the modulator 700, filters the signals, and outputs resultant signals.

The transmission controller 900 controls the common channel generator 100, the symbol modulator 200, the channel gain unit 300, the antenna mapper 400, the multiplexer 500, the scrambler 600, the modulator 700, and the filter 800 of the transmitter.

A method for transmitting the common channel by using the common channel transmitter according to the exemplary embodiment of the present invention will now be described with reference to FIG. 2.

FIG. 2 shows a flowchart for a common channel transmitting method according to an exemplary embodiment of the present invention.

As shown in FIG. 2, the common channel generator 100 generates a plurality of downlink common channels (S100). That is, the primary synchronization channel generator 110 of the common channel generator 100 generates sequences with a length of 36 that are used for the primary synchronization channel sequence, and alternately arranges the generated 36 sequences to thus generate a primary synchronization channel signal to be allocated to 72 subcarriers. In this instance, the signal output by the primary synchronization channel generator 110 has a complex value.

The secondary synchronization channel signal is generated by the secondary synchronization channel generating module 120 as follows. First, the secondary synchronization channel sequence generating module 121 generates secondary synchronization channel sequences allocated to a plurality of cell groups within the coverage of the base station, and the secondary synchronization modulation signal generating module 122 generates a secondary synchronization modulation signal for modulating the secondary synchronization channel. The secondary synchronization channel sequence generated by the secondary synchronization channel sequence generating module 121 has a complex value. The complex signal uses one of "1+j", "1−j", "−1+j", and "−1−j", and the 4 signals each have their own function.

In detail, the 4 signals are generated so as to provide additional information about the secondary synchronization channel to the mobile station. The information includes first information for indicating a start time of the secondary synchronization channel and second information for indicating the number of transmit antennas.

When the entire frame is given 10 ms, the secondary synchronization channel of the frame is transmitted with intervals of 5 ms. In this instance, when the same sequence is used to transmit the data by using the secondary synchronization channel, the time reference of 5 ms for the secondary synchronization channel can be found and the time reference of the 10 ms frame that is the entire frame cannot be found. Therefore, when two sequences with the length of 72 are allocated to the cell group, the first sequence can be used for transmission of the first secondary synchronization channel of the 10 ms frame, and the second sequence can be used for transmission of the second secondary synchronization channel. Further, it is possible to allocate the sequences with the length of 144 to the cell group, use the first 72 sequences for the first transmission, and use the next 72 sequences for the second transmission.

However, when one sequence with the length of 72 is allocated to the cell group, a modulation signal is used so as to identify the first sequence and the second sequence. In detail, the first sequence and the second sequence are identifiable by using the 1-bit modulation signal information.

On having received the secondary synchronization channel signal by using the secondary synchronization channel, the mobile station receives a pilot channel signal to identify the cell to which the mobile station belongs. In this instance, since the secondary synchronization channel uses TSTD and the pilot channel uses the frequency allocated per antenna and the signal allocated to the resource, the mobile station must check whether transmission diversity is applied to the primary broadcasting channel so as to receive the pilot channel.

In this instance, when the mobile station can receive information on the neighboring cell such as a handover in advance, the mobile station can check the state of transmission diversity of the neighboring cell in advance. However, since no information is obtained from the case of an initial cell search, it is needed to instantly check the transmission diversity when receiving the secondary synchronization channel. For this purpose, a modulation signal is required.

In order to check the state of transmission diversity, the mobile station can detect all primary broadcasting channels transmitted by the base station and check the detection result, which however uses a long detection time since there are many primary broadcasting channels to be detected. Therefore, when the secondary synchronization channel is transmitted after the transmission diversity information is applied thereto, it means that the detection means is applied without influencing the system performance, and hence it is possible to reduce the detection time and check the state of transmission diversity.

Referring to FIG. 2, the secondary synchronization symbol generating module 123 of the secondary synchronization channel generator 120 generates a secondary synchronization channel signal by multiplying the secondary synchronization channel sequence generated by the secondary synchronization channel sequence generating module 121 and the secondary synchronization modulation signal output by the secondary synchronization modulation signal generating module 122.

The pilot channel generator 130 of FIG. 2 generates a reference symbol (or a pilot channel signal). In order to generate the pilot channel signal, the reference sequence generating module 131 generates a sequence for the reference symbol that is allocated for each cell group, and the orthogonal sequence generating module 132 generates an orthogonal sequence used for identifying the cell in the cell group. The reference symbol generating module 133 generates a pilot channel signal by multiplying the sequence for the reference symbol generated by the reference sequence generating module 131 and the orthogonal sequence generated by the orthogonal sequence generating module 132.

The primary broadcasting channel generator 140 in FIG. 1 generates a primary broadcasting channel signal for broadcasting common information. Here, the broadcasting channel broadcasts cell information, and uses the primary broadcasting channel and the secondary broadcasting channel. Cell information that is not changed is transmitted to the primary broadcasting channel, and the primary broadcasting channel is used to measure the initial operation or the handover by the mobile station. The secondary broadcasting channel is used to transmit information including a parameter that is variable by conditions.

Therefore, it is needed for the mobile station to receive the primary broadcasting channel so as to search for the cell through the initial operation, and the mobile station can find a mobile station to be reported by using the primary broadcasting channel in the case of measuring the neighboring cell for the handover. The primary broadcasting channel according to the exemplary embodiment of the present invention will now be described.

The additional common channel generator 150 in FIG. 1 generates the primary synchronization channel signal, the secondary synchronization channel signal, the pilot channel signal, and the additional common channel signals other than the broadcasting channel signal.

The symbol modulator 200 modulates and outputs the primary synchronization channel signal, the secondary synchronization channel signal, the pilot channel signal, the primary broadcasting channel signal, and the additional common channel signal generated by the common channel generator 100. In this instance, the signal output by the primary synchronization channel generator 110 has a complex value, and the symbol modulator 200 may not perform the symbol modulation process.

On receiving the signal modulated by the symbol modulator 200 (S110), the channel gain unit 300 multiplies the signal and the channel gain that satisfies the power allocated to the primary synchronization channel (S120), and outputs a resultant signal to the antenna mapper 400. The antenna mapper 400 maps the signal for each antenna (S130) in consideration of the transmission diversity applied to the primary synchronization channel.

Since the primary synchronization channel uses the time switched transmit diversity (TSTD) scheme so that a plurality of antennas may alternately transmit the data, the antenna that is allocated to transmit the data with reference to the designated time is controlled to alternately transmit the data. However, when the data are transmitted through one antenna, another antenna transmits no data, and hence the orthogonality for identifying the data can be acquired. The multiplexer 500 multiplexes the frequency resource allocated to the primary synchronization channel and the signals mapped on the time resource for the respective antennas (S140).

Since the primary synchronization channel has a great uncertainty for the time synchronization in the time dimension, it is needed to transmit data to the mobile station by using the last symbol of the OFDM symbol so as to reflect the unreliability. In this instance, the primary synchronization channel transmits data at regular intervals of 5 ms.

For the mobile station estimates the channel by using the primary synchronization channel and detects the secondary synchronization channel through the coherent method so as to acquire the system's performance improvement, the primary synchronization channel is maintained the orthogonality through the TDM scheme and is transmitted at the time position adjacent to the primary synchronization channel.

The pilot channel is transmitted for each antenna according to the FDM scheme when the base station has multiple antennas.

When the common channels are allocated to the OFDM symbol, the scrambler 600 in FIG. 2 scrambles the OFDM symbol in which the common channels are included (S150), and the modulator 700 modulates the OFDM symbol that is input as a quadrature phase together with the in-phase symbol (S160). The in-phase signal and the quadrature phase signal modulated by the modulator 700 are input to the filter 800, are then filtered (S170), and are then transmitted to the mobile station.

The common channel is described to be generated according to an order in the exemplary embodiment of the present invention, and the present invention is not restricted thereto. Also, symbol modulation by the symbol modulator 200, channel gain reflection by the channel gain unit 300, antenna mapping by the antenna mapper 400, signal scrambling by the scrambler 600, modulation by the modulator 700, filtering by the filter 800, and controlling by the controller 900 are known to a person skilled in the art, and hence will not be described in the exemplary embodiment of the present invention.

A method for the multiplexer 500 to allocate the common channel to the OFDM symbol will now be described with reference to FIG. 3.

FIG. 3 shows a flowchart for a common channel mapping method according to an exemplary embodiment of the present invention.

A method for allocating the primary synchronization channel, the secondary synchronization channel, and the primary broadcasting channel from among the various common channels to the OFDM symbol according to an exemplary embodiment of the present invention will now be described.

As shown in FIG. 3, the multiplexer 500 receives the common channel that is generated by the common channel generator 100 and has undergone the modulation, the channel gain reflection, and the antenna mapping (S141). The multiplexer 500 allocates the primary synchronization channel, the secondary synchronization channel, and the primary broadcasting channel to the symbols at specific positions. Since the primary synchronization channel has a great uncertainty for the time synchronization in the time domain, the primary synchronization channel is allocated to the last symbol of the OFDM symbol so as to reflect the uncertainty (S142).

The secondary synchronization channel is allocated to the OFDM symbol so as to be adjacent to the primary synchronization channel (S143). This is because it is required for the secondary synchronization channel to maintain the orthogonality with the primary synchronization channel according to the TDM scheme, and the secondary synchronization channel is allocated to be adjacent to the primary synchronization channel so that the mobile station may estimate the channel based on the primary synchronization channel and detect the secondary synchronization channel according to the coherent method.

Finally, the primary broadcasting channel is allocated to the OFDM symbol prior to the secondary synchronization channel (S144). This is because the primary broadcasting channel can be allocated to the same location as the reference symbol of the pilot channel when there is a lot of primary synchronization channel information and a plurality of OFDM symbols are used.

In this case, the primary broadcasting channel signal is allocated to the frequency resource allocated to the primary broadcasting channel irrespective of the pilot channel, and the reference symbol is punched in the resource for transmitting the pilot channel so that the respective resources may be allocated since the method for coding the primary broadcasting channel is not changed, irrespective of the number of transmit antennas. Further, when the encoding scheme is used by assuming the case of using a plurality of antennas so as to use the same encoding scheme, the case of a single antenna uses less resources and hence performance degradation can occur.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for generating a common channel for a downlink by a base station having a plurality of antennas, the method comprising:

generating a common channel signal for generating a common channel for generating common data to be provided to a plurality of mobile stations through the downlink, the common channel signal including a primary synchronization channel signal, a secondary synchronization channel signal, and a primary broadcasting channel signal;

mapping the common channel signal on the plurality of antennas; and receiving the common channel signal mapped on the plurality of antennas according to the plurality of antennas;

allocating the common channel signal to a subcarrier and a time resource in an order of a predetermined primary broadcasting channel, a secondary synchronization channel, and a primary synchronization channel; and outputting a symbol, wherein generating the common channel signal comprises:

generating a secondary synchronization channel sequence allocated to a plurality of cell groups within a coverage area of the base station;

generating a complex secondary synchronization modulation signal for modulating a secondary synchronization channel; and multiplying the secondary synchronization modulation signal and the secondary synchronization channel sequence to generate the secondary synchronization channel signal.

2. The method of claim 1, wherein generating the common channel signal further comprises:
  generating a primary synchronization channel sequence for generating the primary synchronization channel signal; and
  generating the primary synchronization channel signal by alternately arranging the primary synchronization channel sequence.

3. The method of claim 1, wherein the complex secondary synchronization modulation signal notifies the mobile stations of information for indicating a start time of the secondary synchronization channel signal and information on a number of antennas of the base station.

4. The method of claim 1, wherein the secondary synchronization channel signal includes information on whether the primary broadcasting channel includes transmission diversity and information on a position in which the secondary synchronization channel signal will be transmitted.

5. The method of claim 4, wherein the common channel signal further includes a pilot channel signal, and
  wherein generating the common channel signal further comprises:
  generating a reference sequence allocated to a cell group including the mobile stations;
  generating an orthogonal sequence for identifying a lower cell in the cell group; and
  multiplying the reference sequence and the orthogonal sequence to generate the pilot channel signal.

6. The method of claim 5, wherein outputting the symbol comprises:
  allocating the primary synchronization channel signal to the subcarrier and a last symbol of the time resource;
  allocating the secondary synchronization channel signal to the subcarrier and the time resource that are adjacent to the primary synchronization channel signal and are prior to the primary synchronization channel signal; and
  allocating the primary broadcasting channel signal to at least one time resource that is adjacent to the secondary synchronization channel signal and is prior to the secondary synchronization channel signal.

7. The method of claim 6, wherein the secondary synchronization channel signal uses a same secondary synchronization channel sequence to acquire position information of the time resource.

8. The method of claim 6, wherein when a resource allocation position of the primary broadcasting channel signal corresponds to a resource allocation position of the pilot channel signal, the pilot channel signal punches the primary broadcasting channel signal.

9. The method of claim 8, wherein the primary broadcasting channel signal is encoded through a predetermined encoding method irrespective of a number of transmit antennas.

10. The method of claim 1, further comprising generating a scramble sequence for scrambling the output symbol.

11. The method of claim 10, further comprising:
  performing a symbol modulation process on the common channel signal;
  reflecting a gain for the common channel to the symbol modulated signal;
  scrambling the output symbol by using the generated scramble sequence;
  modulating the scrambled symbol; and
  filtering the modulated symbol.

12. A device for generating a common channel for a downlink by a base station having a plurality of antennas, the device comprising:
  a common channel generator for generating a common channel signal for generating a common channel for transmitting common data to be provided to a plurality of mobile stations through the downlink, the common channel signal including a primary synchronization channel signal, a secondary synchronization channel signal, a pilot channel signal, and a primary broadcasting channel signal;
  an antenna mapper for mapping the common channel signal on the plurality of antennas;
  a multiplexer for receiving the common channel signal mapped on the plurality of antennas according to the plurality of antennas, and allocating the common channel signal to a subcarrier and a time resource in an order of the primary broadcasting channel signal, the secondary synchronization channel signal, and the primary synchronization channel signal, and outputting a symbol; and
  a scrambler for scrambling the symbol by using a scramble sequence,
  wherein the common channel generator comprises a secondary synchronization channel generator for generating the secondary synchronization channel signal, and
  wherein the secondary synchronization channel generator comprises:
  a secondary synchronization channel sequence generating module for generating a secondary synchronization channel sequence allocated to a plurality of cell groups within a coverage area of the base station;
  a secondary synchronization modulation signal generating module for generating a secondary synchronization modulation signal for modulating a secondary synchronization channel; and
  a secondary synchronization symbol generating module for generating the secondary synchronization channel signal by multiplying the secondary synchronization modulation signal and the secondary synchronization channel sequence.

13. The device of claim 12, wherein the common channel generator further comprises:
  a primary synchronization channel generator for generating the primary synchronization channel signal;
  a pilot channel generator for generating the pilot channel signal;
  a primary broadcasting channel generator for generating the primary broadcasting channel signal for broadcasting fixed information to a cell; and
  a scramble sequence generator for generating the scramble sequence for scrambling the symbol.

14. The device of claim 13, wherein the pilot channel generator comprises:
  a reference sequence generating module for generating a reference sequence allocated to a cell group including the mobile stations;
  a orthogonal sequence generating module for generating an orthogonal sequence for identifying a lower cell within the cell group including the mobile stations; and
  a reference symbol generating module for generating the pilot channel signal by multiplying the reference sequence and the orthogonal sequence.

15. The device of claim 13, further comprising:
  a symbol modulator for receiving the common channel signal from the common channel generator, performing a symbol modulation process thereon, and outputting a symbol modulated signal;
  a channel gain unit for receiving the symbol modulated signal and reflecting a gain for each common channel;

a modulator for receiving and modulating a symbol output by the scrambler;
a filter for filtering the modulated symbol; and
a transmission controller for generating control signals for controlling the common channel generator, the symbol modulator, the channel gain unit, the antenna mapper, the multiplexer, the scrambler, the modulator, and the filter.

* * * * *